US011172096B2

(12) United States Patent
Tamura

(10) Patent No.: US 11,172,096 B2
(45) Date of Patent: Nov. 9, 2021

(54) IMAGE PROCESSING PERFORMING EDGE ENHANCEMENT BASED ON PIXEL ISOLATION

(71) Applicant: CANON KABUSHIKI KAISHA, Tokyo (JP)

(72) Inventor: Hirokazu Tamura, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/883,708

(22) Filed: May 26, 2020

(65) Prior Publication Data

US 2020/0288039 A1 Sep. 10, 2020

Related U.S. Application Data

(63) Continuation of application No. 15/719,369, filed on Sep. 28, 2017, now Pat. No. 10,701,241.

(30) Foreign Application Priority Data

Oct. 7, 2016 (JP) .............................. JP2016-198895

(51) Int. Cl.
*H04N 1/409* (2006.01)
*H04N 1/00* (2006.01)
*H04N 1/10* (2006.01)
*H04N 1/60* (2006.01)

(52) U.S. Cl.
CPC ....... *H04N 1/4092* (2013.01); *H04N 1/00037* (2013.01); *H04N 1/00039* (2013.01); *H04N 1/10* (2013.01); *H04N 1/6008* (2013.01)

(58) Field of Classification Search
CPC .............. H04N 1/4092; H04N 1/6008; H04N 1/00037; H04N 1/00039; H04N 1/10
See application file for complete search history.

(56) References Cited

U.S. PATENT DOCUMENTS

2014/0369599 A1* 12/2014 Tamura ..................... G06T 5/20
382/164

* cited by examiner

*Primary Examiner* — Christopher Wait
(74) *Attorney, Agent, or Firm* — Canon U.S.A., Inc. I.P. Division

(57) ABSTRACT

An image processing apparatus includes a detection unit, a determination unit, a decision unit, and a processing unit. The detection unit detects an isolated pixel included in an image. The determination unit determines whether the isolated pixel detected by the detection unit changes brighter or darker by edge enhancement processing. The decision unit decides an edge enhancement amount of the isolated pixel based on a determination result of the determination unit. The processing unit performs the edge enhancement processing on the isolated pixel, based on the edge enhancement amount decided by the decision unit.

24 Claims, 6 Drawing Sheets

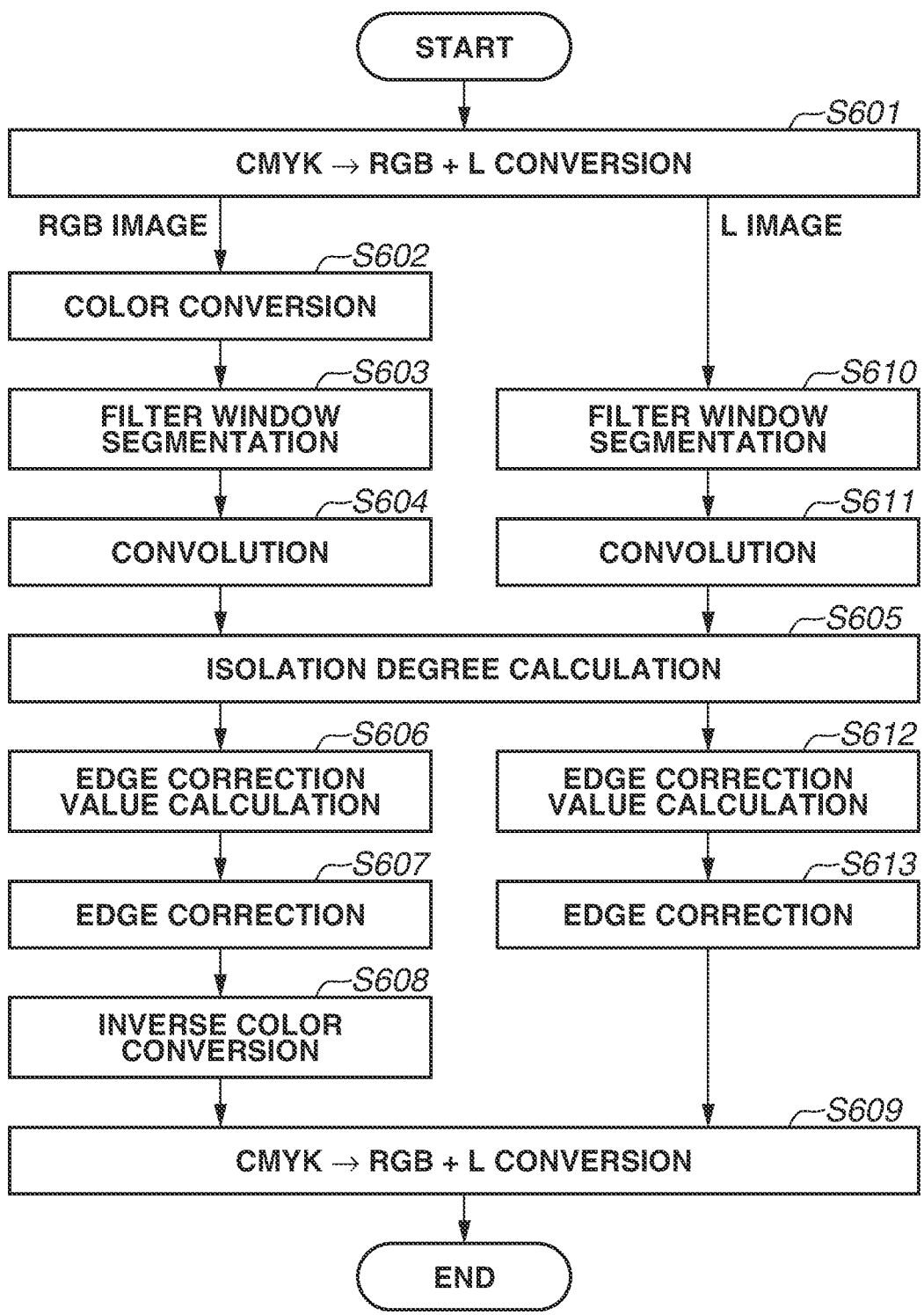

IMAGE PROCESSING PERFORMING EDGE ENHANCEMENT BASED ON PIXEL ISOLATION

CROSS-REFERENCE TO RELATED APPLICATION

This application is a continuation of U.S. patent application Ser. No. 15/719,369 filed Sep. 28, 2017, which claims the benefit of Japanese Patent Application No. 2016-198895, filed Oct. 7, 2016, each of which is hereby incorporated by reference herein in their entirety.

BACKGROUND OF THE INVENTION

Field of the Invention

The present disclosure relates to an image processing apparatus and an image processing method performing enhancement processing of an edge included in an image.

Description of the Related Art

Performing edge enhancement processing on an image increases readability of a character image and sharpens a picture to improve image quality. As the processing, convolution operation using a filter is commonly used. The edge enhancement processing converts the image into an image in which contrast in the vicinity of the edge is enhanced. More specifically, at a position at which a bright region and a dark region are adjacent to each other, a bright part becomes brighter and a dark part becomes darker through the conversion, which emphasizes a boundary therebetween. As a result, the boundary looks sharper.

However, when the edge enhancement processing is performed on a noise component included in the image, for example, on an isolated point (i.e., a process target pixel isolated from surrounding pixels), noise is enhanced. To address this issue, Japanese Patent Application Laid-Open No. 2008-52446 discusses processing of detecting the noise component at an isolated point in the image and suppresses the degree of the edge enhancement to the isolated point according to an isolation degree of the detected isolated point being larger.

However, when the degree of the edge enhancement to the isolated point included in the image is suppressed an isolated point to be originally enhanced may not be enhanced. For example, as for the isolated point that has a mirror reflection component brighter than surroundings in the image, it is preferable that edge enhancement is performed to improve texture to improve the image quality.

SUMMARY OF THE INVENTION

According to an aspect of the present invention, an image processing apparatus includes a detection unit configured to detect an isolated pixel included in an image, a determination unit configured to determine whether the isolated pixel detected by the detection unit changes brighter or darker by edge enhancement processing, a decision unit configured to decide an edge enhancement amount of the isolated pixel based on a determination result of the determination unit, and a processing unit configured to perform the edge enhancement processing on the isolated pixel, based on the edge enhancement amount decided by the decision unit.

Further features of the present invention will become apparent from the following description of embodiments with reference to the attached drawings.

BRIEF DESCRIPTION OF THE DRAWINGS

FIG. 6 is a flowchart illustrating edge enhancement processing according to a second embodiment.

DESCRIPTION OF THE EMBODIMENTS

Embodiments will be described below with reference to the appended drawings.

<Configuration of Image Forming Apparatus>

Figure 1:
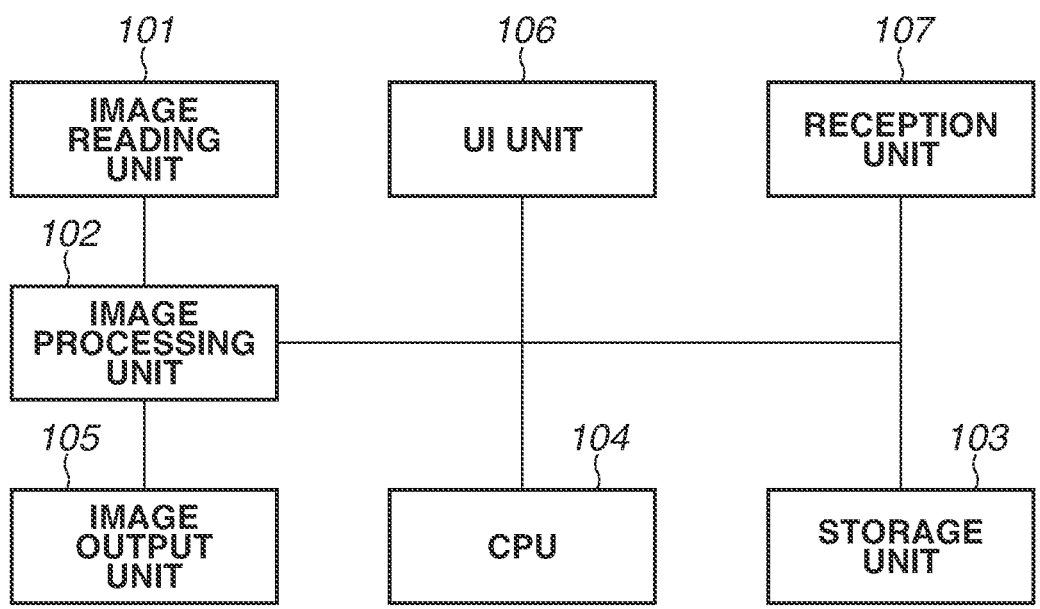
FIG. 1 is a block diagram illustrating a schematic configuration of an image forming apparatus serving as an image processing apparatus according to an embodiment.

FIG. 1 is a block diagram illustrating a configuration of an image forming apparatus serving as an image processing apparatus that includes an edge enhancement function according to a first embodiment. As illustrated in FIG. 1, the image forming apparatus includes an image reading unit 101, an image processing unit 102, a storage unit 103, a central processing unit (CPU) 104, an image output unit 105, a user interface (UI) unit 106, and a reception unit 107. In addition, the image forming apparatus is connectable to, for example, a server that manages image data and a personal computer (PC) that instructs execution of printing, through a network and the like.

The image reading unit 101 reads an image of a document and outputs image data. The image processing unit 102 converts print information into intermediate information (hereinafter, referred to as "object"), and stores the object into an object buffer of the storage unit 103. The print information includes image data provided from outside through the image reading unit 101, the reception unit 107, and the like. Further, the image processing unit 102 generates bitmap data on the basis of the buffered object, and stores the bitmap data into a buffer of the storage unit 103. At this time, the image processing unit 102 performs color conversion processing, edge enhancement processing, and the like. The details of the processing will be described below.

The storage unit 103 is configured of a read-only memory (ROM), a random access memory (RAM), a hard disk (HD), or the like. The ROM stores various kinds of control programs and image processing programs that are executed by the CPU 104. The RAM is used as a reference region in which the CPU 104 stores data and various kinds of information, or a work area. In addition, the RAM and the HD are used for storing the above-described object buffer. Moreover, the RAM and the HD hold process parameters necessary for the image processing as well. In the RAM and the HD, the image data is accumulated, pages are sorted, a document including the plurality of sorted pages is accumulated, and a plurality of copies of the document is printed out.

The image output unit 105 forms a color image on a recording medium such as recording paper (sheet) and outputs it. The UI unit 106 is used to performs operation to give an instruction to an apparatus about a kind of image processing, level adjustment, and the like performed in the image processing unit 102. For example, the UI unit 106 sets an adjustment amount of the above-described image processing. The reception unit 107 receives print image data from outside, and stores the print image data in the storage unit 103 or provides the print image data to the image output unit 105. Further, the reception unit 107 transmits and outputs the image data accumulated in the storage unit, to the outside of the apparatus.

<Overview of Apparatus>

Figure 2:
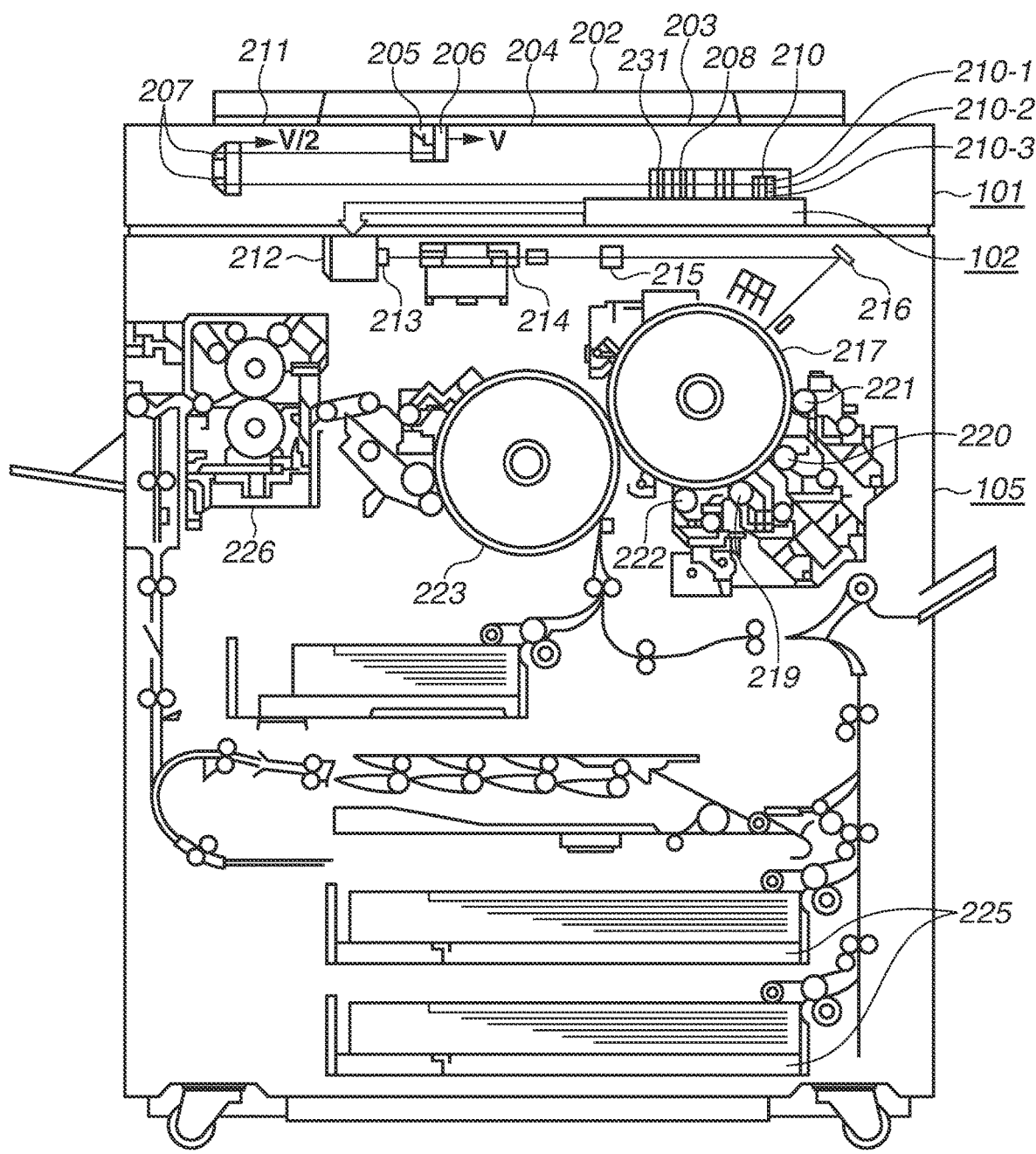
FIG. 2 is an overview diagram schematically illustrating the image forming apparatus according to an embodiment.

FIG. 2 is an overview diagram schematically illustrating the image forming apparatus. At the image reading unit 101, a document 204 from which an image is read is placed between a platen glass 203 and a document pressing plate 202, and the document 204 is irradiated with light from a lamp 205. Light reflected by the document 204 is guided by mirrors 206 and 207, and an image is formed on a three-line sensor 210 by a lens 208. Further, an infrared cut filter 231 is provided on the lens 208. A mirror unit that includes the mirror 206 and the lamp 205 is moved by a motor (not illustrated) in an arrow direction at a speed V, and a mirror unit that includes the mirror 207 is moved by a motor (not illustrated) in the arrow direction at a speed V/2. In other words, the mirror units are moved in a direction (sub-scanning direction) perpendicular to an electric scanning direction (main-scanning direction) of the three-line sensor 210, thereby scanning the entire surface of the document 204.

The three-line sensor 210 that includes charge-coupled device (CCD) line sensors (hereinbelow, referred to as CCDs) 210-1, 210-2, and 210-3 of three lines separates color of input optical information, reads respective color components of red R, green G, and blue B in full-color information, and transmits signals of the respective color components to the image processing unit 102. Each of the CCDs configuring the three-line sensor 210 includes light receiving elements corresponding to 5000 pixels, and reads an A3-sized document in s shorter direction (297 mm) with a resolution of 600 dpi. The A3 size is a maximum document size that can be placed on the platen glass 203

A reference white board 211 is for correcting the data that has been read by the CCDs 210-1 to 210-3 of the three-line sensor 210. The reference white board 211 has white color that shows substantially uniform reflection characteristics for visible light.

The image processing unit 102 electrically processes the image signal provided from the three-line sensor 210, thereby generating respective color component signals of cyan C, magenta M, yellow Y, and black K (CMYK). The image processing unit 102 transmits the generated color component signals of CMYK to the image output unit 105. The image output at this time is a CMYK image subjected to halftone processing such as dither.

The image signals of C, M, Y, and K transmitted from the image reading unit 101 are transmitted to a laser driver 212 in the image output unit 105. The laser driver 212 modulates and drives a semiconductor laser element 213 according to the provided image signals. A laser beam output from the semiconductor laser element 213 scans a photosensitive drum 217 through a polygon mirror 214, an f-θ lens 215, and a mirror 216, to form an electrostatic-latent image on the photosensitive drum 217.

A development unit includes a magenta development unit 219, a cyan development unit 220, a yellow development unit 221, and a black development unit 222. The four development units alternately come into contact with the photosensitive drum 217, to sequentially develop the electrostatic-latent images formed on the photosensitive drum 217 with toners of corresponding colors to form respective toner images. The recording paper fed from a recording paper cassette 225 is wound around a transfer drum 223, and the toner images on the photosensitive drum 217 are sequentially transferred to the recording paper.

The recording paper on which the toner images of the respective four colors of C, M, Y, and K have been sequentially transferred in the above-described manner passes through a fixing unit 226, which fixes the toner image, and the resultant recording paper is discharged to the outside of the apparatus.

Figure 3:
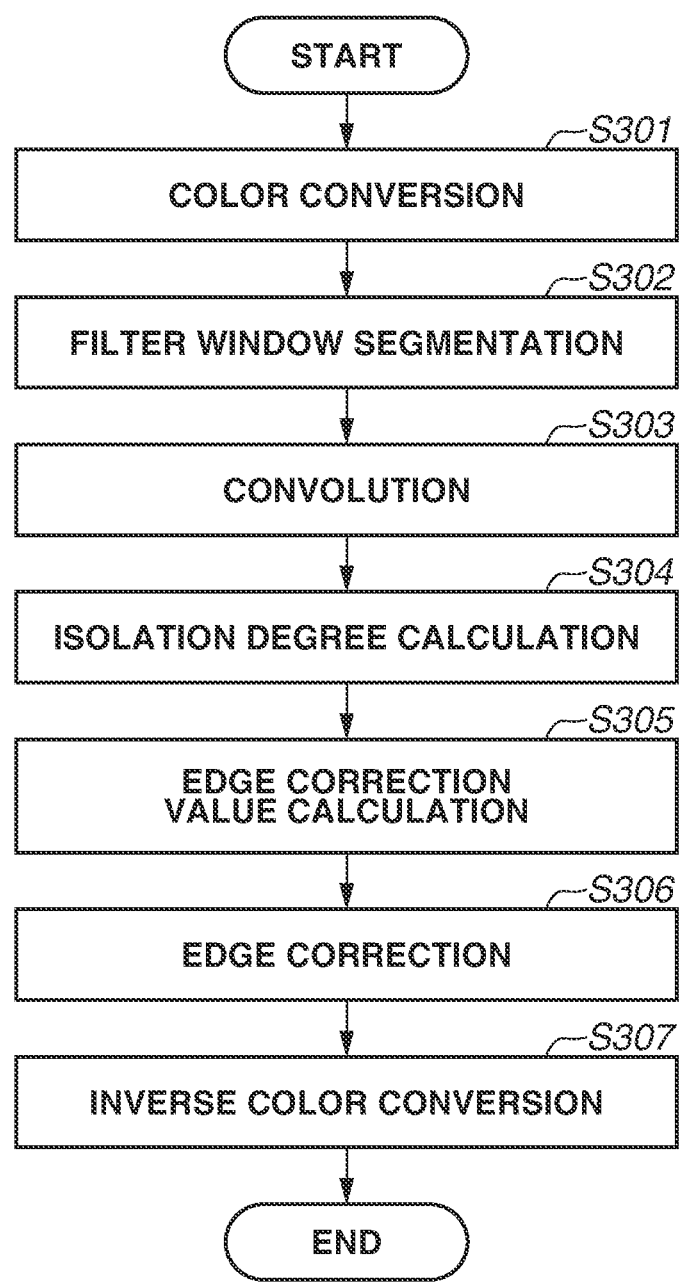
FIG. 3 is a flowchart illustrating edge enhancement processing according to a first embodiment.

The edge enhancement processing performed on the image by the image processing unit 102, which is a distinctive point of the first embodiment, is described in detail below with reference to FIG. 3. Processes illustrated in the following flow are processed by the image processing unit 102 on the basis of the instruction from the CPU 104.

In addition, it is assumed that pixels of the input image data include pixels of three colors of RGB, and are arranged in a horizontal direction (row direction) and in a vertical direction (column direction).

First, in step S301, the image processing unit 202 performs color conversion processing on the input RGB image data to convert the RGB image data into image data in a color space of luminance and color difference system. In other words, color conversion from the RGB components into YCbCr components is performed. Color conversion expressions are described below.

$$Y = 0.2990*R + 0.5870*G + 0.1140*B$$

$$Cb = -0.1687*R - 0.3313*G + 0.5000*B$$

$$Cr = 0.5000*R - 0.4187*G - 0.0813*B \tag{1}$$

When signal values (e.g., a value from 0 to 255 in an 8-bit signal) of Red, Green, Blue in the input RGB image are respectively denoted by R, G, and B, the signal values R, G, and B are respectively converted into signal values Y (0 to 255), Cb (−128 to 127), and Cr (−128 to 127). The input RGB image is converted through the conversion into luminance Y and color differences Cb and Cr.

Next, in step S302, the image processing unit 102 segments a window from the YCbCr signal obtained in step S301. The window includes a plurality of pixels and has a predetermined size. A window of five pixels×five pixels is used in the present embodiment.

Next, in step S303, the image processing unit 102 carries out filter arithmetic processing on the signal of the luminance Y of the window obtained in step S302, thereby performing the edge enhancement processing. A method in which a secondary differential component is calculated with use of a Laplacian filter and the calculated value is added to the signal value of the original image, is commonly used for edge enhancement. The calculation of the secondary differential component is performed with use of a filter matrix described below.

0.09 −0.18 −0.27 −0.18 −0.09
0.18 0.09 0.36 0.09 −0.18
0.27 0.36 1.08 0.36 −0.27
0.18 0.08 0.36 0.09 −0.18
0.09 −0.18 −0.27 −0.18 −0.09

The center of the 5×5 matrix (in this example, the position multiplied by 1.08) corresponds to an interest pixel of the window, and becomes the output result at the position. It is necessary to make the size of the filter matrix equal to or smaller than the size of the segmentation window in step S302. The process in step S303 is performed only on the luminance Y, and is not performed on the color differences Cb and Cr. This enhances only the brightness of the edge part of the image, which makes it possible to suppress color variation at the edge part to some extent. The value thus obtained is thereafter handled as an edge component of luminance dY. The value of the edge component dY is a variation of the luminance Y of the interest pixel through the process in step S303. An absolute value of the edge component dY becomes lager and variation of the original image also becomes larger as it comes closer to the edge part. In addition, it is determined that the interest pixel is brighter than the surrounding pixels when the symbol of the edge component dY is "+", and it is determined that the interest pixel is darker than the surrounding pixels when the symbol of the edge component dY is "−".

Next, in step S304, the image processing unit 102 determines whether the interest pixel of the window segmented in the process in step S302 is a pixel isolated from surrounding pixels, and determines an isolation degree in the window.

As the isolated pixel determined at this time, not a pixel of noise that occurs, in digitization of the acquired image by the three-line sensor 210, as sensor characteristics not present in the actual image, but an isolated pixel actually present as texture of the image, is assumed. For example, a position of texture such as irregularity and stain that partially appears on a uniform region such as a wall, or a position of a mole, a pore, or the like that appears on a skin of a person corresponds to such an isolated pixel. Typically, if the above-described textures are enhanced more than necessary through excessive edge enhancement, unnatural artifact occurs and is felt as image deterioration. However, it is not possible to achieve sufficient enhancement effect with respect to the normal edge part other than the isolated pixel by weak edge enhancement processing that does not cause unnatural artifact. Therefore, it is necessary to suppress the edge enhancement with respect to the isolated pixel. However, when the edge enhancement processing is suppressed based on whether the interest pixel is isolated from the surrounding pixels it is not possible to sufficiently enhance the isolated pixel to be enhanced. The isolated pixel to be enhanced is represented by a mirror reflection component that is a regular reflection component of light coming into a substance. The mirror reflection component appears, on the image, as a whitely-bright isolated pixel, depending on the surface property of the substance and the condition of coming light. Enhancing the component makes it possible to increase glossiness in a case of a metal, and to enhance freshness in a case of food.

Therefore, in step S304, the isolation degree is calculated in order to distinguish the isolated pixel, included in the image, to be subjected to the edge-enhancement and the isolated pixel, included in the image, not to be subjected to the edge-enhancement. The isolated pixel not to be subjected to the edge-enhancement includes a white noise pixel in a black solid image. As the specific isolation degree, two parameters, i.e., the isolation degree of the interest pixel from the surrounding pixels and whether the interest pixel is brightly isolated or darkly isolated from the surrounding pixels are obtained. In this example, the brightly-isolated position is considered as the mirror reflection component. Therefore, the control is performed so as to further enhance the edge of the brightly-isolated position. In contrast, image deterioration may occur on the darkly-isolated position by the edge enhancement. Therefore, the control is performed so as to suppress the edge enhancement at the darkly-isolated position.

Figure 4:
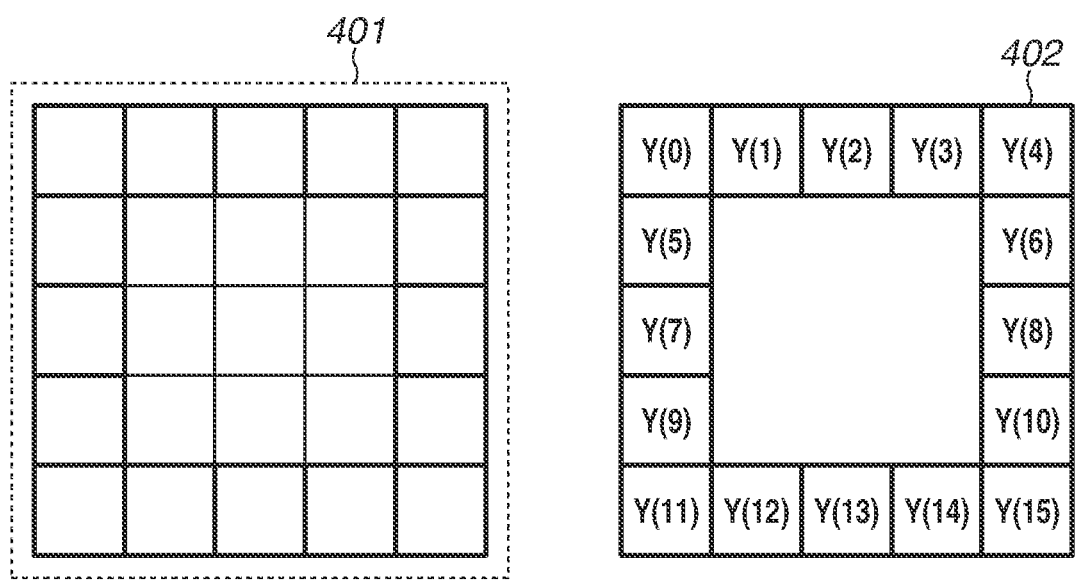
FIG. 4 is a diagram illustrating an interest pixel of a window and surrounding pixels according to the first embodiment.

Specific process is described with reference to FIG. 4. An average value aveY of the luminance (Y) components of a plurality of surrounding pixels 402(Y(0) to Y(15)) excluding the interest pixel in the segmented window 401 is obtained by the following expression (3).

$$aveY = 1/16 * \Sigma Y(i) \quad (3)$$

In addition, a standard deviation devY is obtained by the following expression (4).

$$devY = 1/16 \Sigma (aveY - Y(i))^2 \quad (4)$$

The smaller standard deviation indicates that the image is low in variation of pixel value and has flat periphery. The relationship of the isolation degree of the interest pixel is obtained, as the following table 1, from the standard deviation devY calculated by the expression (4) and the magnitude of the absolute value |dY| of the luminance edge component dY obtained in step S303.

TABLE 1

| | devY | |
| --- | --- | --- |
| |dY| | Small | Large |
| Small | Small in isolation degree | Small in isolation degree |
| Large | Large in isolation degree | Small in isolation degree |

For example, when the standard deviation devY is large, the interest pixel is estimated as a non-isolated pixel because variation around the pixel is large. In contrast, the interest pixel may be an isolated pixel when the standard deviation devY is small. When the standard deviation devY is small and the absolute value |dY| of the edge component dY is large, the interest pixel is estimated as an isolated pixel because variation of the surrounding pixel is small and flat in spite of the large edge component. On the other hand, when the absolute value |dY| of the edge component dY is small and the standard deviation devY is also small, it is found that the image is flat. The isolation degree becomes large in the lower-left direction of the table.

In addition, focusing on the symbol (plus or minus) of the edge component dY makes it possible to determine whether the interest pixel is brighter or darker than the surrounding pixels. When the symbol of the edge component dY is "+", the interest pixel is corrected in a direction increasing the pixel value through the edge enhancement processing, which causes the interest pixel to become brighter. In other words, when the symbol of the edge component dY is "+" and the interest pixel is an isolated pixel, it is found that the interest pixel is brighter than the surrounding pixels, i.e., corresponds to the mirror reflection component. In contrast, when the symbol of the edge component dY is "−" and the interest pixel is an isolated pixel, it is found that the interest pixel is darker than the surrounding pixels. For example, the interest pixel corresponds to a position of a mole, a pore, or the like appearing on a human skin. The standard deviation devY and the symbol of the edge component dY are used as the isolation degree in step S304.

Figure 5:
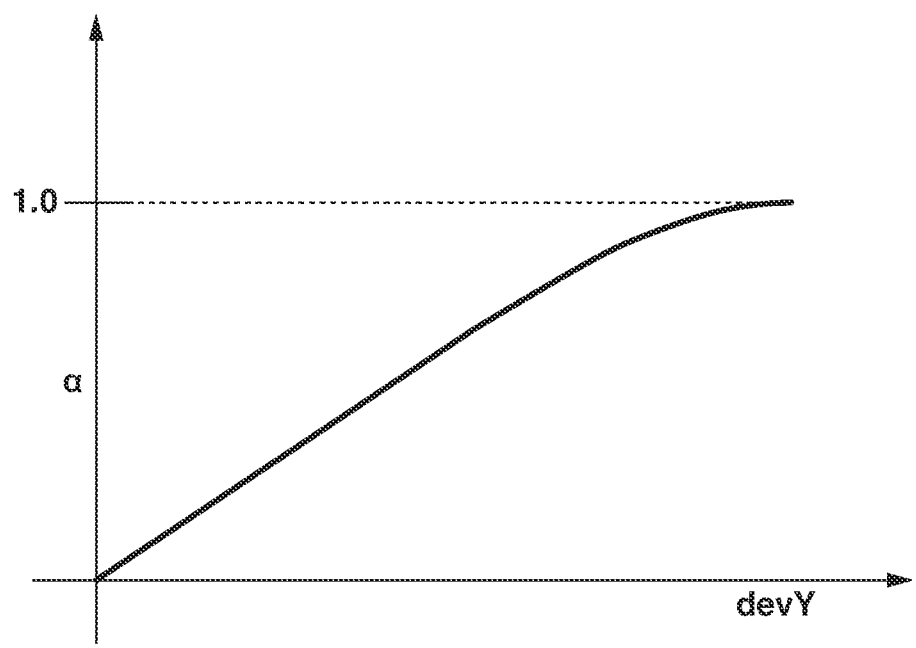
FIG. 5 is a graph illustrating a relationship between a standard deviation and a correction value α according to the first embodiment.

Next, in step S305, the image processing unit 102 determines suppression degree of the edge enhancement according to the standard deviation devY obtained in step S304. In other words, a correction value for suppression of an edge enhancement amount is calculated. As described above, as a result of the determination in step S303, weakening the edge enhancement to the isolated pixel darker than the surrounding pixels and strengthening the edge enhancement to the isolated pixel brighter than the surrounding pixels make it possible to improve image quality. In other words, it is necessary to strengthen the edge enhancement irrespective of the standard deviation devY when the symbol of the edge component dY is whereas it is necessary to weaken the edge enhancement on the basis of whether the interest pixel is an isolated pixel when the symbol of the edge component dY is "−". It is considered that the interest pixel is isolated when the symbol of the edge component dY is "−" and the value of the standard deviation devY is smaller. Therefore, the edge enhancement is suppressed when the symbol of the edge component dY is "−". The correction value α is a positive value up to 1.0. The correction value α is defined as a value that controls the edge enhancement. It is unnecessary to suppress the edge enhancement when the correction value α is 1.0, whereas it is necessary to suppress the edge enhancement when the correction value α is smaller. When the symbol of the edge component dY is "<", i.e., when the interest pixel becomes darker as a result of the edge enhancement, the conversion is performed with use of a curve illustrated in FIG. 5. FIG. 5 is a graph in which the standard deviation around the window is plotted in a horizontal axis, and the correction value α is plotted in a vertical axis, when the symbol of the edge component dY is "−". When the standard deviation is zero, i.e., when the part around the window is flat, the edge enhancement is not performed, and the correction value α is accordingly set to zero. In the graph of FIG. 5, the correction value α is exemplified as a curve coming close to 1.0 from the origin because possibility that the interest pixel is an isolated pixel is decreased as the standard deviation increases. In addition, when the symbol of the edge component dY is "+", 1.0 is output as the correction value α because it is unnecessary to suppress edge enhancement as with mirror reflection.

The correction value α is determined in the above-described manner. A lookup table (LUT) with the standard deviation devY as the input is used for this processing, instead of using a calculation expression. The LUT is held by the storage unit 103, and is loaded during the processing.

Further, FIG. 5 illustrates the LUT in which the correction value α is continuously varied with respect to the variation of the standard deviation devY. As a simpler method, threshold processing in which the correction value α is set to 1.0 when the standard deviation devY exceeds a predetermined value, can be considered. However, when such a method is used, the degree of the edge enhancement is changed from a certain point in the image in which the standard deviation is gradually varied, and the change of the degree of the edge enhancement is visually recognized. Therefore, it is necessary to continuously vary the correction value α with respect to variation of the standard deviation devY.

Next, in step S306, the image processing unit 102 performs the edge correction with use of the correction value α obtained in step S305, the edge component dY of the luminance obtained in step S303, and the luminance Y determined in step S301, thereby obtaining final luminance Y'. The final luminance Y' is obtained through calculation of the following expression (5).

$$Y' = Y + \alpha * dY \quad (5)$$

Since the maximum value of the correction value α is 1.0, the maximum edge enhancement is performed when the correction value α is 1.0, and the edge enhancement is suppressed as the correction value α becomes lower than 1.0 because the additional amount of the secondary differential component obtained through convolution decreases and accordingly the variation to the original image decreases.

Finally, in step S307, the image processing unit 102 performs conversion into RGB signal values as output. The calculation corresponds to inverse matrix operation of the color conversion performed in step S301, and the conversion is performed by the following expression (6).

$$R = Y' + 1.4020 * Cr$$

$$G = Y' - 0.3441 * Cb - 0.7141 * Cr$$

$$B = Y' + 1.7720 * Cb \quad (6)$$

Such a process flow makes it possible to perform the edge enhancement processing of the isolated pixel corresponding to mirror reflection or the like while suppressing excessive edge enhancement of the isolated pixel that is darker than the surrounding pixels. Thus, an RGB color image with favorable enhanced edge can be obtained.

In the present embodiment, the luminance and color differences YCbCr are used for the color conversion, however, similar conversion is achievable also in a color space such as Lab as long as the color space is in luminance and color difference system. Likewise, a method using an unsharp mask or the like may be used for the edge enhancement in addition to the method described above.

In addition, in the present embodiment, the isolation degree is calculated with use of the standard deviation devY of the luminance Y of the surrounding pixels of the interest pixel, however, the calculation method is not limited thereto. Any other feature amount may be used as long as the feature amount relates to variance of the luminance Y of the surrounding pixels of the interest pixel. For example, a variance value of the surrounding pixels or a difference between the interest pixel and an average value of the surrounding pixels may be used. In addition, it is possible to use magnitude of the average value as a reference value of whether the interest pixel is isolated from the surrounding pixels.

Further, in the present embodiment, the standard deviation devY is obtained from the luminance values of the 16 surrounding pixels of the interest pixel, however, only pixels at four apexes of the window may be used to simplify the calculation.

The description is given in the first embodiment while the input is assumed to be the RGB image, however, the processing may be performed on a CMYK image that is a signal of ink concentration.

Therefore, in a second embodiment, a configuration that makes it possible to perform edge enhancement on the input CMYK image is described. The CMYK image serves as signal data indicating ink concentration of respective colors of cyan, magenta, yellow, and black.

Description for the configuration and the overview of the image forming apparatus similar to those of the first embodiment and the description of the overlapped flows are omitted.

The flow in the present embodiment is described with reference to FIG. 6. Description of processes in steps S602 to S608 overlapping with the flow described in FIG. 3 are omitted because the processes in step S602 to S608 are equivalent to the processes in step S301 to S307 described in the first embodiment. The processes are executed by the image processing unit 102 according to of the instruction from the CPU 104, as with the existing embodiment.

In step S601, the image processing unit 102 separates components CMY and K from the input CMYK image, and converts the components CMY into the components RGB and converts the component K into a brightness component L. More specifically, the conversion into the components RGB and Y is performed through the operation of the following expression (7).

$$R=255-C$$
$$G=255-M$$
$$B=255-Y$$
$$L=255-K \quad (7)$$

The calculation is based on that the CMYK image is 8-bit signal data with 256 gradations. An edge-enhanced R'G'B' image is obtainable from RGB components through the flow of steps S602 to S608.

In parallel with these processes, processes in steps S610 to S613 are performed on the L image without performing color conversion processing and inverse color conversion processing.

Two values of the standard deviation devY and a standard deviation devL are necessary for the process in step S605 in order to calculate the isolation degree. The standard deviation devY is calculated on the basis of the luminance Y obtained from the components RGB as with in step S304. The standard deviation devL is calculated on the basis of the brightness component L. It is determined that the surrounding pixels of the interest pixel are flat and the interest pixel is estimated as the isolated pixel when the two standard deviations are small. In contrast, when one of the standard deviations is large, it is estimated that the possibility that the interest pixel is isolated is low because the surrounding pixels are not flat. Accordingly, larger one of the two standard deviations is used as the isolation degree.

The processes in steps S612 and S613 are processes similar to those in steps S607 and S608 for the RGB components. The edge correction is performed in step S613 on the basis of the correction value obtained as a result of the processes, which results in a corrected L image signal L'.

The image processing unit 102 uses signals R', G', B', and L' obtained in the above-described manner to return the image to the CMYK image. More specifically, the image processing unit 102 converts the signals through the following expression (8).

$$C'=255-R'$$
$$M'=255-G'$$
$$Y'=255-B'$$
$$K'=255-L' \quad (8)$$

The configuration makes it possible to perform favorable edge enhancement processing also on the image, the input of which is CMYK, similar to the image, the input of which is RGB described in the above-descried first embodiment. In addition, there are other methods of converting signal values CMYK into signal values RGB. For example, a method of the following expression (9) may be used.

$$R=255-\text{Min}(255, C+K)$$
$$G=255-\text{Min}(255, M+K)$$
$$B=255-\text{Min}(255, Y+K) \quad (9)$$

The example in which the larger one of the standard deviations is used as the isolation degree has been described, however, the method is not limited thereto. For example, the two standard deviations may be handled independently of each other, the result of the standard deviation devY may be used as the isolation degree for the luminance Y obtained from RGB, the standard deviation devL may be used as the isolation degree for the brightness component L, and two correction values a may be used.

The present disclosure makes it possible to adaptively set the edge enhancement amount with respect to the interest pixel, depending on the feature amount relating to the variance of the surrounding pixels of the interest pixel and whether the interest pixel is brighter or darker than the surrounding pixels.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to embodiments, it is to be understood that the invention is not limited to the disclosed embodiments. The scope of the following claims is to be accorded the broadest interpretation so as to encompass all such modifications and equivalent structures and functions.

What is claimed is:

1. An image processing method for an image processing apparatus, the image processing method comprising:
   detecting an isolated pixel positioned in a region in a vicinity of an edge in an image;
   determining whether the region is a bright region or a dark region;
   deciding an edge enhancement amount of the region based on a determination result of the determining; and
   performing the edge enhancement processing on the isolated pixel, based on the decided edge enhancement amount.

2. An image processing apparatus comprising:
at least one processor and at least one memory to perform operations including:
performing edge enhancement processing on at least a first isolated pixel which is brighter relative to a first surrounding area in an image, wherein the first surrounding area includes a first plurality of pixels which are away from the first isolated pixel by a first predetermined number of pixels, and
weakening the edge enhancement processing on at least a second isolated pixel which is darker relative to a second surrounding area in the image, wherein the second surrounding area includes a second plurality of pixels which are away from the second isolated pixel by a second predetermined number of pixels.

3. The image processing apparatus according to claim 2, wherein performing includes determining that the first isolated pixel is brighter than the first surrounding area and determining that the second isolated pixel is darker than the second surrounding area.

4. The image processing apparatus according to claim 3, wherein determining whether a pixel of interest is brighter or darker than a surrounding area is based on a result of performing filter operation using a luminance of an image pixel of interest included in the image and a luminance of surrounding the image pixel of interest.

5. The image processing apparatus according to claim 2, wherein performing includes not performing the edge enhancement processing on the second isolated pixel which is included in the image and is darker relative to the second surrounding area.

6. The image processing apparatus according to claim 5, wherein the first isolated pixel which is brighter relative to the first surrounding area is a pixel indicating a specular reflection component in the image.

7. The image processing apparatus according to claim 5, wherein the second isolated pixel that is darker relative to the second surrounding area is a pixel indicating a mole or a pore of a person included in the image.

8. The image processing apparatus according to claim 2, wherein the operations further include:
acquiring a feature amount relating to dispersion of pixels surrounding the second isolated pixel, and
determining a degree of weakening the edge enhancement processing depending the acquired feature amount.

9. The image processing apparatus according to claim 8, wherein the feature amount relating to dispersion of the surrounding pixels is a standard deviation obtained from a plurality of surrounding pixels of a pixel of interest, and determining includes increasing the degree of weakening the edge enhancement processing the smaller the standard deviation.

10. The image processing apparatus according to claim 2, wherein the image is a red, green, blue (RGB) image data, and performing includes performing the edge enhancement processing on a luminance converted from the RGB image data.

11. A method for an image processing apparatus, the method comprising:
performing edge enhancement processing on at least a first isolated pixel which is brighter relative to a first surrounding area in an image, wherein the first surrounding area includes a first plurality of pixels which are away from the first isolated pixel by a first predetermined number of pixels; and
weakening the edge enhancement processing on at least a second isolated pixel which is darker relative to a second surrounding area in the image, wherein the second surrounding area includes a second plurality of pixels which are away from the second isolated pixel by a second predetermined number of pixels.

12. The method according to claim 11, wherein performing includes determining that the first isolated pixel is brighter than the first surrounding area and determining that the second isolated pixel is darker than the second surrounding area.

13. The method according to claim 12, wherein determining whether a pixel of interest is brighter or darker than a surrounding area is based on a result of performing filter operation using a luminance of an image pixel of interest included in the image and a luminance of surrounding the image pixel of interest.

14. The method according to claim 11, wherein performing includes not performing the edge enhancement processing on the second isolated pixel which is included in the image and is darker relative to the second surrounding area.

15. The method according to claim 14, wherein the first isolated pixel which is brighter relative to the first surrounding area is a pixel indicating a specular reflection component in the image.

16. The method according to claim 14, wherein the second isolated pixel that is darker relative to the second surrounding area is a pixel indicating a mole or a pore of a person included in the image.

17. The method according to claim 11, wherein the operations further include:
acquiring a feature amount relating to dispersion of pixels surrounding the second isolated pixel, and
determining a degree of weakening the edge enhancement processing depending the acquired feature amount.

18. The method according to claim 17, wherein the feature amount relating to dispersion of the surrounding pixels is a standard deviation obtained from a plurality of surrounding pixels of a pixel of interest, and determining includes increasing the degree of weakening the edge enhancement processing the smaller the standard deviation.

19. The method according to claim 11, wherein the image is a red, green, blue (RGB) image data, and performing includes performing the edge enhancement processing on a luminance converted from the RGB image data.

20. A non-transitory computer-readable storage medium storing a program to cause a computer to perform a method for an image processing apparatus, the method comprising:
performing edge enhancement processing on at least a first isolated pixel which is brighter relative to a first surrounding area in an image, wherein the first surrounding area includes a first plurality of pixels which are away from the first isolated pixel by a first predetermined number of pixels; and
weakening the edge enhancement processing on at least a second isolated pixel which is darker relative to a second surrounding area in the image, wherein the second surrounding area includes a second plurality of pixels which are away from the second isolated pixel by a second predetermined number of pixels.

21. The image processing apparatus according to claim 2, wherein the first surrounding area consists of a first plurality of pixels which are away from the first isolated pixel by a first predetermined number of pixels.

22. The image processing apparatus according to claim 2, wherein the second surrounding area consists of a second plurality of pixels which are away from the second isolated pixel by a second predetermined number of pixels.

23. The method according to claim 11, wherein the first surrounding area consists of a first plurality of pixels which are away from the first isolated pixel by a first predetermined number of pixels.

24. The method according to claim 11, wherein the second surrounding area consists of a second plurality of pixels which are away from the second isolated pixel by a second predetermined number of pixels.

* * * * *